United States Patent [19]
Hock

[11] Patent Number: 5,806,885
[45] Date of Patent: Sep. 15, 1998

[54] IGNITION ORIFICE IN FLUID FUELED INFLATOR

[75] Inventor: Christopher Hock, Uintah, Utah

[73] Assignee: Autoliv ASP, Inc., Ogden, Utah

[21] Appl. No.: 840,061

[22] Filed: Apr. 24, 1997

[51] Int. Cl.[6] .................................................. B60R 21/26
[52] U.S. Cl. ........................................ 280/737; 280/741
[58] Field of Search .................................. 280/737, 741, 280/736, 742; 102/530, 531

[56] References Cited

U.S. PATENT DOCUMENTS

| | | | |
|---|---|---|---|
| 5,060,973 | 10/1991 | Giovanetti | 280/736 |
| 5,330,730 | 7/1994 | Brede et al. | 280/737 |
| 5,470,104 | 11/1995 | Smith et al. | 280/737 |
| 5,487,561 | 1/1996 | Mandzy et al. | 280/741 |
| 5,639,117 | 6/1997 | Mandzy et al. | 280/737 |
| 5,649,720 | 7/1997 | Rink et al. | 280/741 |
| 5,669,631 | 9/1997 | Johnson et al. | 280/737 |

*Primary Examiner*—Paul N. Dickson
*Attorney, Agent, or Firm*—Sally J. Brown

[57] ABSTRACT

An improved inflator wherein a flowing combustible fluid is combusted in a combustion zone defined by diverging walls is disclosed. The improved inflator provides enhanced consistency of operation thereby permitting the use of lighter components while avoiding deployments which produce excessive "bag slap".

18 Claims, 2 Drawing Sheets

IGNITION ORIFICE IN FLUID FUELED INFLATOR

BACKGROUND OF THE INVENTION

1. Field of the Invention

The present invention provides an improved system for igniting inflators which provide a quantity of gas sufficient to inflate an associated inflatable apparatus by the combustion, or exothermic decomposition, of a combustible fluid. The invention has particular application in fluid-fueled inflators used to inflate the airbag, or cushion, of the passive restraint systems used in vehicles and commonly referred to as airbags.

2. Description of Related Art

Many types of inflator devices for inflating the airbag/cushion of such airbag systems have been disclosed. Such inflators should be capable of releasing a sufficient quantity of a non-toxic gas to inflate the airbag cushion in a very short period of time. Additionally, the inflator needs to provide a high degree of reliability over the extended temperature range in which modern vehicles are expected to operate, and over the expected extended lifetime of the vehicle, typically fifteen years.

One of the earliest disclosed inflator designs relies on a stored compressed gas which is released to inflate the airbag. Another design relies on the ignition of a solid gas generating material to produce a sufficient quantity of gas to inflate the airbag. A third type of inflator relies on the combination of an inert stored compressed gas which is heated and augmented by the gases resulting from the combustion of a solid gas generating material. While these designs are functional to provide the gas needed to inflate an airbag, they each have disadvantages. The designs which rely on release of a stored compressed gas must provide a relatively strong gas storage container, the relatively thick walls of which increase the weight and bulk of the airbag assembly, a concern to vehicle manufacturers who generally seek to minimize the weight of their vehicles. The designs which rely on the ignition of a solid gas generant material usually result in a generated gas which contains solid particulate material at a sufficiently elevated temperature that it requires further conditioning, such as filtering and cooling, before it encounters either the fabric cushion of the airbag assembly or the occupants of the vehicle it is intended to protect.

Some of the more recent inflator designs rely on fluid fuels and oxidants which, in addition to lower manufacturing costs, offer advantages such as, cleaner generated gases which contain little or no solid particulate matter, and which can be provided at relatively low temperatures and with relatively low concentrations of incomplete products of combustion. Some of these designs are more fully described in U.S. Pat. No. 5,470,104, entitled FLUID FUELED AIR BAG INFLATOR, filed by Bradley W. Smith and Karl K. Rink, and commonly assigned with this application. U.S. Pat. No. 5,470,104 is hereby incorporated by reference.

The earliest fluid fuel inflator designs typically relied on the combustion of a stored mixture of a fluid fuel and a fluid oxidizer by igniting the mixture in the chamber in which it is stored. This technique, sometimes referred to as "bang and drain", results in an extremely rapid combustion of the entire stored mixture, which, in turn, results in the production of relatively high maximum or peak pressures, and, therefore, provides a relatively rapid opening and hard airbag cushion. The high peak pressure produced requires a relatively strong inflator made of thicker and heavier material than would be required were lesser peak pressures produced. Moreover, while it is a requirement that airbags open rapidly in order to provide their intended protection of vehicle occupants, it is now recognized that the "bag slap", or the force with which a bag contacts the occupant, can be excessive in that it can be more than what is required to provide the intended protection. Recent designs of fluid fuel inflators which store a combustible fluid have resorted to combusting the fluid as it flows to and/or through a combustion zone which is separate and removed from the chamber in which the combustible fluid is stored, whereby the combustion rate can be more effectively controlled by controlling the flow rate at which the fluid is fed to the combustion zone. Examples of such fluid fuel inflator designs are found in U.S. Pat. Nos. 5,060,973 to Giovanetti, 5,487,561 to Mandzy, 5,649,720 to K. Rink et al., and 5,669,631 to Darrin Johnson. The present invention involves an improvement in those fluid fuel inflators which combust a flowing combustible fluid as it passes into and through a combustion zone.

OBJECTS OF THE INVENTION

It is an object of the present invention to provide an improved inflator having enhanced consistency of performance.

A further object is an improved fluid fueled inflator wherein the design of fixed apparatus components enhances the consistency of the inflation characteristics.

A still further object is an inflator with an improved combustion nozzle which provides enhanced control over the combustion reaction.

SUMMARY OF THE INVENTION

When a flowing fluid combustible material is combusted it produces an ignition or flame zone at and adjacent to the point where the fluid is ignited. The flame zone does not necessarily remain stationary relative to the apparatus in which it is located. The capacity of the flame zone to move presents a hazard in that it can move from its intended location within the combustion chamber to a location within the storage chamber at which it can initiate a virtually instantaneous ignition of all of the combustible fluid remaining in that chamber. Such an occurrence could create greater peak pressures in the chamber than otherwise intended, requiring heavier structural components in the inflator as well as producing an unnecessarily heavy "bag slap" in a deploying airbag. The present invention is directed to providing a combustion zone wherein the geometry of the zone inhibits the flame zone from moving from the combustion chamber into the storage chamber. The inventive inflator upon activation provides a flow of combustible fluid which is ignited and combusted in a combustion zone having walls which diverge in the downstream direction. As a flame zone migrates toward the source of the combustible fluid, the geometry of the combustion zone causes an increased rate of heat transfer to the walls of the combustion zone and causes the flame zone to encounter an increased velocity of the combustible fluid being fed to the flame zone. Both of these factors cause increased resistance to further migration of the flame zone toward the source of the combustible fluid flow.

DETAILED DESCRIPTION OF THE INVENTION

When a combustible fluid is combusted in a nozzle, or in a combustion chamber, a flame zone is established where the fluid is initially ignited. A portion of the heat generated in the flame zone is transferred to the wall of the chamber, causing the temperature of the wall to rise. As the combustion proceeds, the wall temperature increases causing the rate of heat transfer to the wall to diminish. As the rate of cooling of the flame zone caused by such heat transfer to the walls is diminished, the temperature of the gases in the flame zone increase, in turn, causing an increase in the burn rate of the combustible fluid. In a combustion zone having a constant cross section and supplied with a combustible fluid at a constant flow rate initially matched to the fluid's initial burn rate, the increased burn rate will cause combustion to occur faster than the fluid is supplied to the combustion zone, resulting in the combustion zone being driven towards the source of the flowing combustible fluid. The movement of the flame zone to a new location creates a new set of boundary conditions wherein an initial relatively high rate of heat transfer to the walls declines as the wall's temperature increases, resulting in the flame zone being driven further and further toward the fluids source, or reservoir.

As explained previously, one of the principal advantages of the newer fluid fuel inflators which ignite a flowing combustible fluid in a combustion chamber which is separate from the fluid fuel's storage chamber, is the ability to control the combustion rate of the fluid fuel whereby a "bang and drain" type of operation is avoided. Should the flame zone be driven into the fluid fuel's storage chamber, or reservoir, a virtually instantaneous combustion, or "bang and drain" operation, would occur, frustrating certain of the advantages attributed to the newer inflators. Accordingly, any features which eliminate, or minimize, the possibility of the flame zone being driven into the fuel's reservoir are desirable. They are especially desirable if they (a) are relatively inexpensive to provide, and (b) are accomplished by modifications in the design of the hardware which are not subject to degradation over the extended lifetime of the airbag system.

Figure 1:
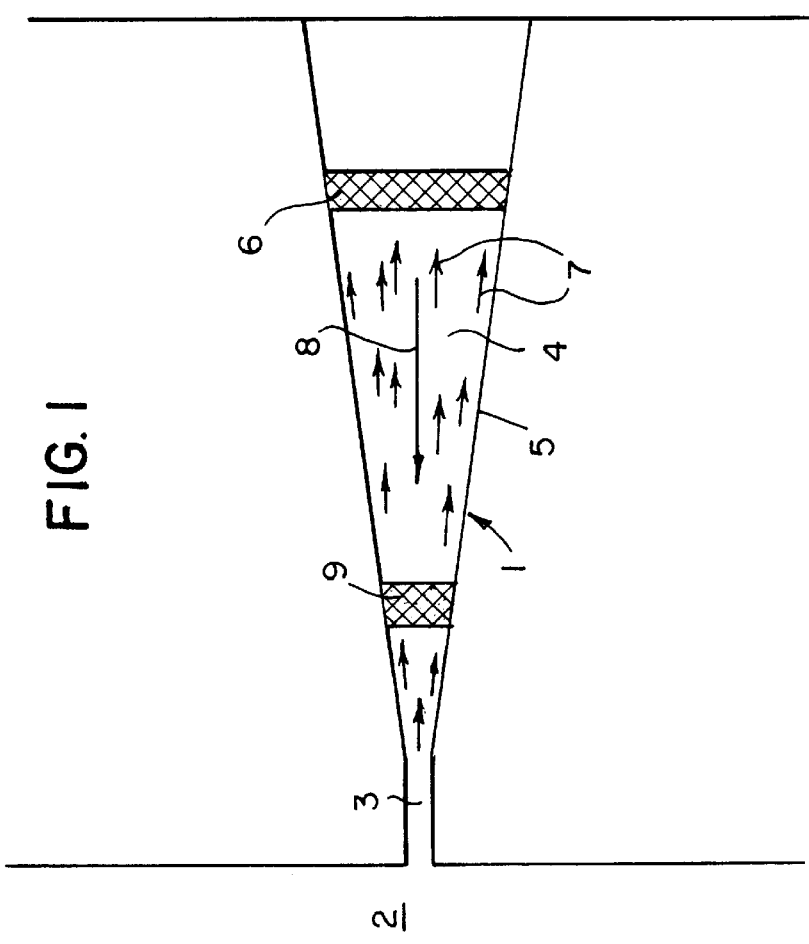
FIG. 1 is a diagrammatic illustration of an inflator according to the present invention.

The present invention provides enhanced consistency of operation by providing a combustion zone, in the form of either a combustion chamber or a combustion nozzle, which has a diverging zone wherein the cross sectional area increases in the direction of fluid flow. FIG. 1 diagrammatically illustrates a combustion chamber 1 in accord with the present invention. In this combustion chamber, the combustible fluid flows from a storage chamber, or reservoir 2, through a throttling zone 3, and into a combustion zone in the form of a combustion chamber 4 having diverging walls 5. When the combustible fluid is initially ignited it forms an initial flame front 6 at a location where the rate of propagation of the flame front is essentially equivalent to the velocity at which the combustible fluid, as depicted by the small arrows 7, is fed to that location. As heat transfer to the walls 5 causes the walls to heat up, which in turn causes the rate of heat transfer away from the flame zone to diminish and the temperature of the flame zone to increase, the flame zone will migrate in the direction of the large arrow 8 toward the source, or reservoir 2, of the combustible fluid. As new flame front locations are established, new sets of boundary conditions are set up, and the process repeats itself. However, the velocity at which the fluid flows into the flame zone increases as the flame zone enters a location with a smaller cross sectional area. Moreover, the ratio of the volume of the flame zone to its surface area (at the wall) becomes smaller resulting in an increased rate of heat transfer as the cross sectional area of the flame zone becomes smaller. Both of these factors provide an increasing resistance to further migration of the flame zone toward the reservoir 2. Accordingly, when migration of the flame zone toward the fluid fuel reservoir occurs in the inventive inflators, an increasing resistance to further migration is encountered until a final flame zone 9 is reached where the flame zone is substantially stabilized until such time as the inflator begins to shut-down due to exhaustion of the fuel supply. Dependent upon the method whereby the combustible fluid is pressurized in the reservoir, such pressure may continuously decrease as the fluid in the reservoir is depleted. In such situations, the rate at which the combustible fluid enters the throttling zone will decrease as the reservoir pressure decreases, resulting in decreased velocities of combustible fluid flow throughout the combustion zone/chamber. This may permit the flame zone to migrate further toward the reservoir, and in some cases enter the reservoir. Such, however, should not occur until after the predominant portion of the combustible fluid has been discharged from the reservoir and combusted in the combustion zone. Accordingly, at the time the flame front reaches the reservoir, only a minor portion of the total combustible fluid would remain therein. The effect produced by essentially instantaneous ignition of such a minor portion of the combustible fluid should be minimal.

Figure 3:
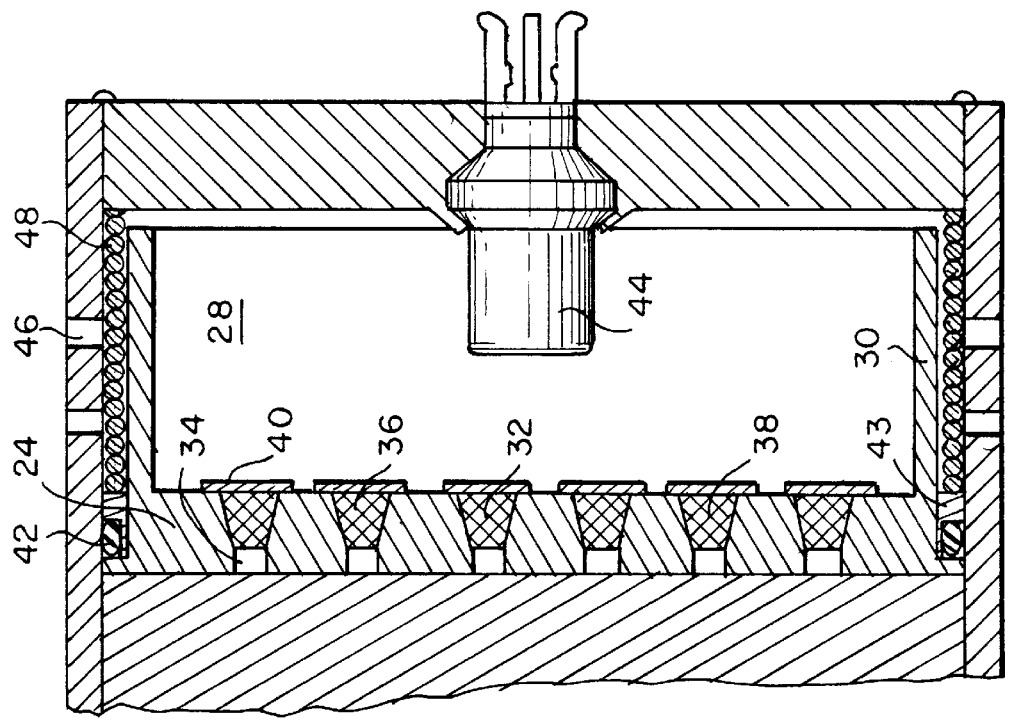
FIG. 3 is a fragmented detailed sectional view of the ignition end of the inflator shown in FIG. 2.
Figure 2:
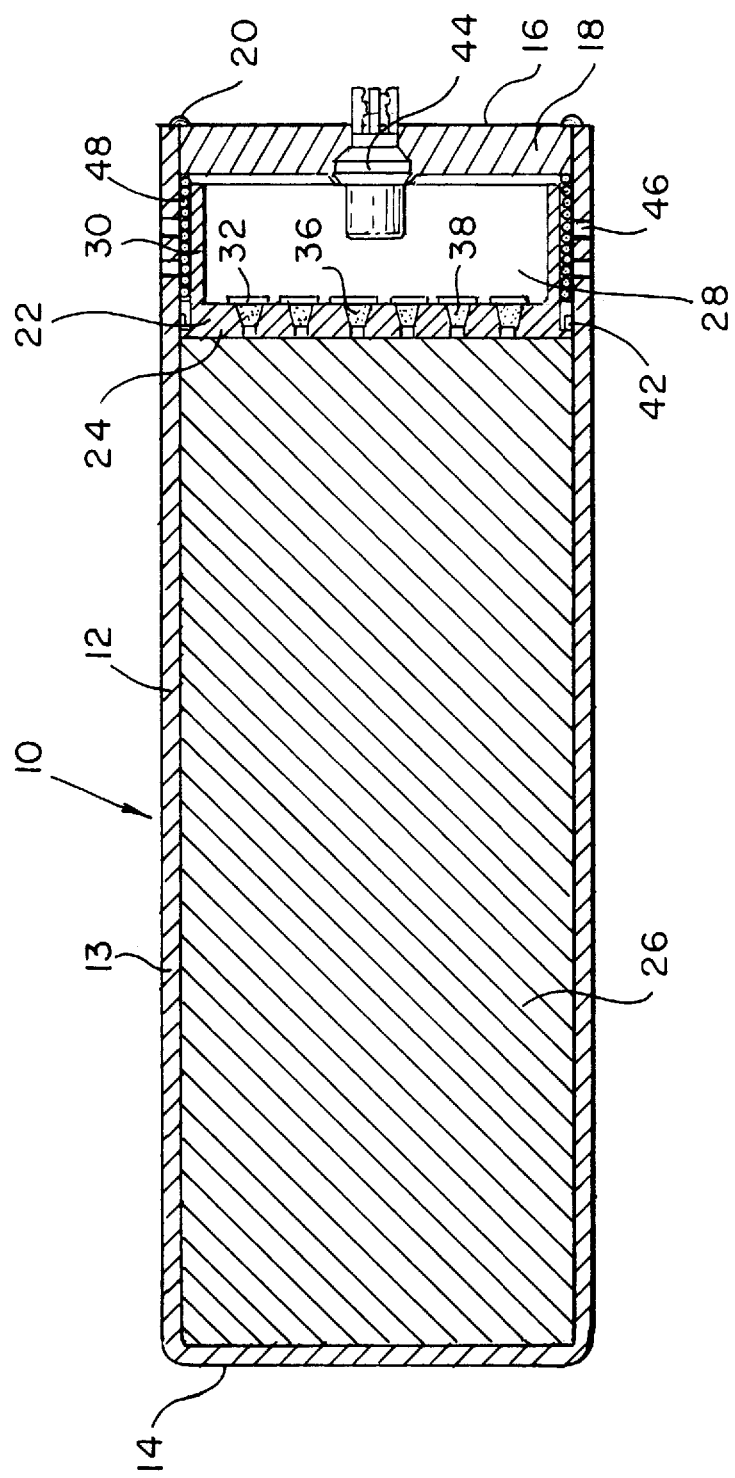
FIG. 2 is a sectional view of a preferred inflator according to the present invention.

A preferred inflator incorporating the present invention is illustrated in FIGS. 2 and 3. FIG. 2 shows the entire inflator, while FIG. 3 provides a view of the ignition end of the inflator.

The inflator 10, comprises an elongated cylindrical housing 12 having a side wall 13 extending from a first closed end 14 to a second ignition end 16. An end closure 18 is fitted within the housing 12 at the second end 16 and a fluid tight seal provided by weld 20.

A piston 22 includes a dividing wall 24 which effectively divides the interior of the housing 12 into a combustible fluid storage chamber, or reservoir 26, and a combustion chamber 28. The piston 22 further includes a depending wall 30 which extends from adjacent the perimeter of the dividing wall 24 toward the end closure 18. A series of nozzles 32 are provided extending through the dividing wall 24 from the storage chamber 26 to the combustion chamber 28. Each nozzle 32 includes a throttling zone 34 which includes the smallest cross sectional area of the nozzle. Each nozzle further includes a diverging zone 36 wherein the nozzle cross sectional area increases with increasing distance from the throttling zone 34. Preferably, a nucleating surface, such as a shaped woven or non-woven metal wire insert 38, is provided in the diverging zone of each of the nozzles. Each nozzle 32 also includes an opening means, such as a breakable seal 40. A fluid-tight sliding relationship is provided between piston 22 and the housing's side wall 13 by a seal, such as an 0-ring 42 held in a recess at the perimeter of the dividing wall 24 by a retainer 43.

An initiator, such as squib 44, is provided in the end closure 18. Exit ports 46 are evenly spaced about the perimeter of the side wall 13 adjacent to the combustion chamber 28. Preferably, particularly when the combustible fluid stored in the storage chamber 26 is a liquid or a liquified gas, a compressed spring 48 is positioned adjacent the side wall 13 to provide a bias on the piston tending to drive the piston toward the first closed end 14.

Upon receipt of an electrical activation signal from an external device, such as a crash sensor, the squib 44 fires producing heat, glowing particles and a shock wave which cause the breakable seals 40 to open. Once the seals are opened, the combustible fluid stored in the storage chamber 26 begins flowing through the nozzles 32 as the spring 48 forces the piston 22 towards the first closed end 14. As the combustible fluid exits the nozzles 32, it encounters and is ignited by the heat and glowing particulate ignition products produced by the squib. Combustion of the fluid results in a greatly expanded volume of heated generated gases which are mixed as they pass through the combustion chamber 28 allowing completion of the combustion reactions. The generated gas passes from the inflator through the exit ports 46 and can then be routed to an associated inflatable apparatus, such as an airbag cushion.

The initial ignition of the combustible fluid after its initial release from the storage chamber 26 may occur after the fluid has left the diverging zone of the nozzle. However, the rate at which such ignition propagates throughout combustion chamber 28 is virtually instantaneous. Accordingly, after such initial ignition, continuing ignition occurs at a flame front established where the ignition propagation meets the stream of combustible fluid flowing into the combustion zone. With properly dimensioned nozzles the flame front should stabilize in the diverging zones 36 of the nozzles 32, preferably on the nucleation surfaces 38.

The nucleation surfaces 38 can be fabricated from layers, or mats, of woven or non-woven metal wires or filaments. The surfaces can be fabricated by cutting a coiled wire screen to length and then compressing the cut lengths into the conical shape required to fit into a diverging zone. Preferably, the resulting structure of nucleation surfaces should seek to maximize surface area while providing minimal resistance to the flow of fluid therethrough. Dependent upon the particular combustible fluid used, the wires or filaments may be fabricated from, or coated with, metals which catalyze the combustion reaction. The opening means or breakable seal 40, may be a portion of the dividing wall 24 which has a thickness substantially less than the thickness of the remainder of the dividing wall. Alternatively, it could be a rupture disc formed from a separate metal sheet and welded to the dividing wall.

It should be apparent that the combustion zone is not restricted to the combustion chamber 28, but extends into the nozzles 32. More particularly, it extends into the diverging zones 36 of the nozzles. Moreover, it is not required that the entire combustion chamber have an essentially constant rate of increase of cross-sectional area in the direction of combustion fluid flow, as is illustrated in the diverging zones of the nozzles. The important feature of the diverging zone(s) is that it begin between the throttling zone in the flowpath of the uncombusted combustible fluid and the location at which the combustible fluid is initially ignited by the ignition products introduced by the actuated initiater, squib 44.

The combustible fluid provided in the storage chamber 26 can be in the gas or liquid phase, or it can be in a mixed phase. The liquid phase is generally preferred as it is denser and will, therefore, require less storage volume. Moreover, fabrication of the inflator is generally less complex with combustible liquids, since they are easier to load into the storage chamber than are pressurized combustible gases. The combustible fluid can comprise (a) a mixture of a fuel with an oxidizer, such as, a mixture of ethyl alcohol or propyl alcohol as the fuel, with oxygen or nitrous oxide ($N_2O$) as the oxidizer, (b) a fluid propellant, such as hydroxylamine nitrate and triethanolamine nitrate (HAN/TEAN), or (c) a fluid exothermically decomposable material, such as acetylene, nitrous oxide ($N_2O$), hydrazine or certain organic peroxides. Any of these combustible fluids can also contain inert diluents, such as, argon, helium, nitrogen, carbon dioxide, xenon or krypton gases. A minor amount of helium is often provided with combustible gases for its enhanced detectability in checking for leaks.

The inflator illustrated includes a spring biased piston separating the combustible fluid storage chamber from the combustion chamber which is particularly adapted for use with liquid combustible fluids. The invention is not limited to use only with such inflators. It could also be advantageously used with other inflators which use liquid combustible fluids such as those illustrated in the previously mentioned U.S. Pat. Nos. 5,060,973 and 5,487,561 and in the U.S. patent application Ser. No. 08/751,717. Moreover, the invention could potentially be used with inflators which use pressurized combustible gases as the combustible fluid, such as those illustrated in U.S. application Ser. No. 08/565,331.

It should be recognized that the foregoing description is provided to advise workers how to make and practice the invention and is not intended to limit the scope of the covered invention. The scope of the invention is defined by the following claims.

I claim:

1. An inflator comprising:
   (a) a storage chamber containing a combustible fluid;
   (b) a combustion chamber;
   (c) an initiator capable of igniting said combustible fluid in said combustion chamber;
   (d) a fluid flow path extending between said storage chamber and said combustion chamber, said fluid flow path including:
      (i) a throttling zone containing the smallest cross sectional area of said fluid flow path, and
      (ii) a diverging zone located between said throttling zone and said combustion chamber, said diverging zone providing an increasing cross sectional area as said diverging zone extends away from said throttling zone; and
   (e) an openable structure sealing said fluid flow path, said openable structure being capable of opening said fluid flow path when said initiator is activated.

2. The inflator of claim 1, wherein:
   at least a portion of said diverging zone is defined by continuously diverging walls defining said fluid flow path.

3. The inflator of claim 2, wherein:
   at least a portion of said diverging zone is shaped like a segment of a cone.

4. The inflator of claim 1, further comprising:
   a nucleating structure located in said diverging zone.

5. The inflator of claim 4, wherein:
   said nucleating structure comprises metal wire.

6. The inflator of claim 1, further comprising:
   a dividing wall located between said storage chamber and said combustion chamber, and wherein
   said fluid flow path extends through said dividing wall.

7. The inflator of claim 6, wherein:
   said diverging zone comprises a conical cavity extending into said dividing wall from said combustion chamber.

8. The inflator of claim 6, wherein:
   said throttling zone comprises the entrance to said fluid flow path from said storage chamber.

9. The inflator of claim 6, wherein:

said storage chamber also comprises a side wall, and said dividing wall is adapted to be displaced along said side wall as said combustible fluid is discharged from said storage chamber through said fluid flow path.

10. The inflator of claim 9, further comprising:

a spring arranged to provide a biased force capable of causing said dividing wall to be displaced when said combustible fluid is discharged.

11. The inflator of claim 6, wherein:

said openable structure comprises a weakened section of said dividing wall.

12. The inflator of claim 11, wherein:

said weakened section comprises a portion of said wall which is not as thick as the remainder of the wall.

13. The inflator of claim 1, wherein said combustible fluid is a liquid.

14. The inflator of claim 1 wherein said combustible fluid is a liquified gas.

15. The inflator of claim 1 wherein said combustible fluid is a gas.

16. An inflator comprising:

(a) a storage chamber containing a combustible fluid;

(b) a fluid flow path extending from said storage chamber, said fluid flow path including:
   (i) a throttling zone containing the smallest cross sectional area of said fluid flow path, and
   (ii) a combustion zone, said combustion zone including a section of increasing cross sectional area as said combustion zone extends away from said throttling zone;

(c) a nucleating structure located in said combustion zone (d) an initiator capable of igniting said combustible fluid in said combustion zone;

(e) an openable structure sealing said fluid flow path, said openable structure being capable of opening said fluid flow path when said initiator is activated.

17. The inflator of claim 16, wherein:

at least a portion of said section of increasing cross sectional area is defined by continuously diverging fluid flow path walls.

18. The inflator of claim 17, wherein:

said continuously diverging fluid flow path walls define the shape of said portion as a segment of a cone.

\* \* \* \* \*